United States Patent [19]

Mueller

[11] Patent Number: 5,174,548
[45] Date of Patent: Dec. 29, 1992

[54] HAND LIFT TRUCK FOR TRANSPORTING STACKING CHAIRS

[76] Inventor: Ernie Mueller, 201 S. Lewis, Bldg. 8, Apt. 303, Orange, Calif. 92668

[21] Appl. No.: 782,824

[22] Filed: Oct. 25, 1991

[30] Foreign Application Priority Data

Feb. 1, 1991 [CA] Canada .................. 2035546

[51] Int. Cl.⁵ .............................................. B66F 5/00
[52] U.S. Cl. ..................................................... 254/10 C
[58] Field of Search ............ 254/2 B, 2 R, 2 C, 10 B, 254/10 R, 10 C, 9 B, 9 R, 9 C, 8 B, 8 R, 8 C; 414/738, 724, 729, 685, 785

[56] References Cited

U.S. PATENT DOCUMENTS

| | | |
|---|---|---|
| 2,121,764 | 6/1938 | Quayle . |
| 2,502,285 | 3/1950 | Smith et al. . |
| 2,891,765 | 6/1959 | Pearne ............... 254/2 B |
| 3,059,904 | 10/1962 | Kimball . |
| 3,086,751 | 4/1963 | Poznik ................ 254/8 B |
| 3,391,905 | 7/1968 | Burns ................ 254/7 B |
| 4,085,953 | 4/1978 | Farwell ............. 254/10 C |
| 4,902,191 | 2/1990 | Cumbest et al. ........... 254/10 R |

FOREIGN PATENT DOCUMENTS

| | | |
|---|---|---|
| 149716 | 8/1913 | Canada . |
| 296996 | 1/1930 | Canada . |
| 362463 | 12/1936 | Canada . |

*Primary Examiner*—Robert C. Watson
*Attorney, Agent, or Firm*—Laubscher & Laubscher

[57] ABSTRACT

A lift truck for carrying stacking chairs, the truck having a main frame carried on front and rear wheels and an elevating platform on the main frame and movable from a lowered inactive position to a stack lifting position. The forward end of the truck, which includes the main frame, front wheels and elevating platform, is of a width to allow the forward end to be pushed between the transverse spaced legs of the lowermost chair in the stack when the elevating platform is in the inactive position. The truck has rear wheel mounting structures which include arm sections which project forwardly of the rear of the lift truck and are disposed laterally outwardly from the sides of the main frame so as to position the rear wheels laterally outward from the main frame and forward of the rear of the main frame. The space between the arm section of the rear wheel mounting structure is open at the front thereof so as to receive the legs of a rear stack of chairs as the forward portion is pushed under the stack. An operator's handle is positioned in the rear of the main frame and a platform raising lever is located on the handle. The lift truck is readily maneuverable and is stable when carrying stacks of chairs which have relatively high centers of gravity.

18 Claims, 3 Drawing Sheets

HAND LIFT TRUCK FOR TRANSPORTING STACKING CHAIRS

BACKGROUND OF THE INVENTION

1. Field of the Invention

The present invention relates to a lift truck, and more particularly to a lift truck for transporting stacks of chairs.

2. Description of the Prior Art

It has become common practice to use in convention centers, meeting halls, community centers, etc. a type of light chair, the legs and frame of which are made from light tubular stock. Other such chairs which are available are formed from a molded plastic, but generally the chairs are free from any transverse reinforcing members between the legs at a position distanced below the seat portion in order that the chairs may be stacked one upon the other so as to provide relatively high stacks of a plurality of chairs for transport and storage. In practice, the stacks are usually hauled from a truck or from a storage area, or possibly from one side of a room to the general area in which they will be used, and then distributed and placed in the required positions. After use, the chairs are restacked and then returned to storage areas.

For many years there have existed lift trucks of the type utilized in factories and warehouses for shifting heavy loads, which are commonly mounted on palates or lifts in order that the lift truck can be pushed under the load prior to lifting. Lift trucks have been provided with various means for raising the load free of the floor while it is pushed or pulled from one location to another. Such lift trucks are shown in Canadian Patent No. 362,423 to Quayle, Dec. 8, 1936, Canadian Patent No. 296,996 to Holman, Jan. 28, 1930 and Canadian Patent No. 149,716 to Chapman et al., May 28, 1913. Also, lift truck devices have been designed particularly for moving furniture, and such a device is shown in U.S. Pat. No. 3,059,904, Oct. 23, 1962 to Kimball. Such structures are not satisfactory, however, for transporting at one time one or more stacks of chairs of the type described above. Various simple devices, such as low, flat dollies have been designed on which the chairs are placed. Frequently with such devices, the stacks of chairs are laid on their sides as tall stacks of chairs have a high center of gravity and are unstable. The lifting of a stack of chairs and particularly the maneuvering of a stack of chairs to lay it on the side is difficult.

SUMMARY OF THE INVENTION

It is an object of the present invention to provide a lift truck which is easy to maneuver and is capable of hauling stacks of chairs in a stable condition in the upright position.

According to the present invention, there is provided a lift truck for transporting stacking chairs of the type having transversely spaced legs and a bottom portion spaced above floor level, the lift truck having a main frame supported on front and rear wheels having a front end, a rear end, and a pair of substantially parallel sides defining a generally rectangular configuration. An elevating platform is carried on the frame and includes lift means for raising the platform from a lower inoperative position to a raised lifting position, the elevating platform in the operative position being disposed at a level lower than the bottom portion of the chair and in the lifting position being higher than the bottom portion of the chair. The truck has a forward portion defined by the main frame, front wheels and elevating platform which has a width less than the transverse spacing of the chair legs so that the forward portion of the truck may be pushed in a fore and aft direction under the lower chair in a stack. Rear wheel mounting means project transversely outwardly and forwardly from the rear end of the frame and define a forwardly open chair leg receiving space between the mounting means at adjacent sides of the main frame. The rear wheel mounting means position the rear wheels transversely outwardly from the sides of the main frame and forwardly of the rear end of the main frame.

BRIEF DESCRIPTION OF THE DRAWINGS

In the accompanying drawings, which show an embodiment of the invention as an example.

DESCRIPTION OF PREFERRED EMBODIMENT

Figure 1:
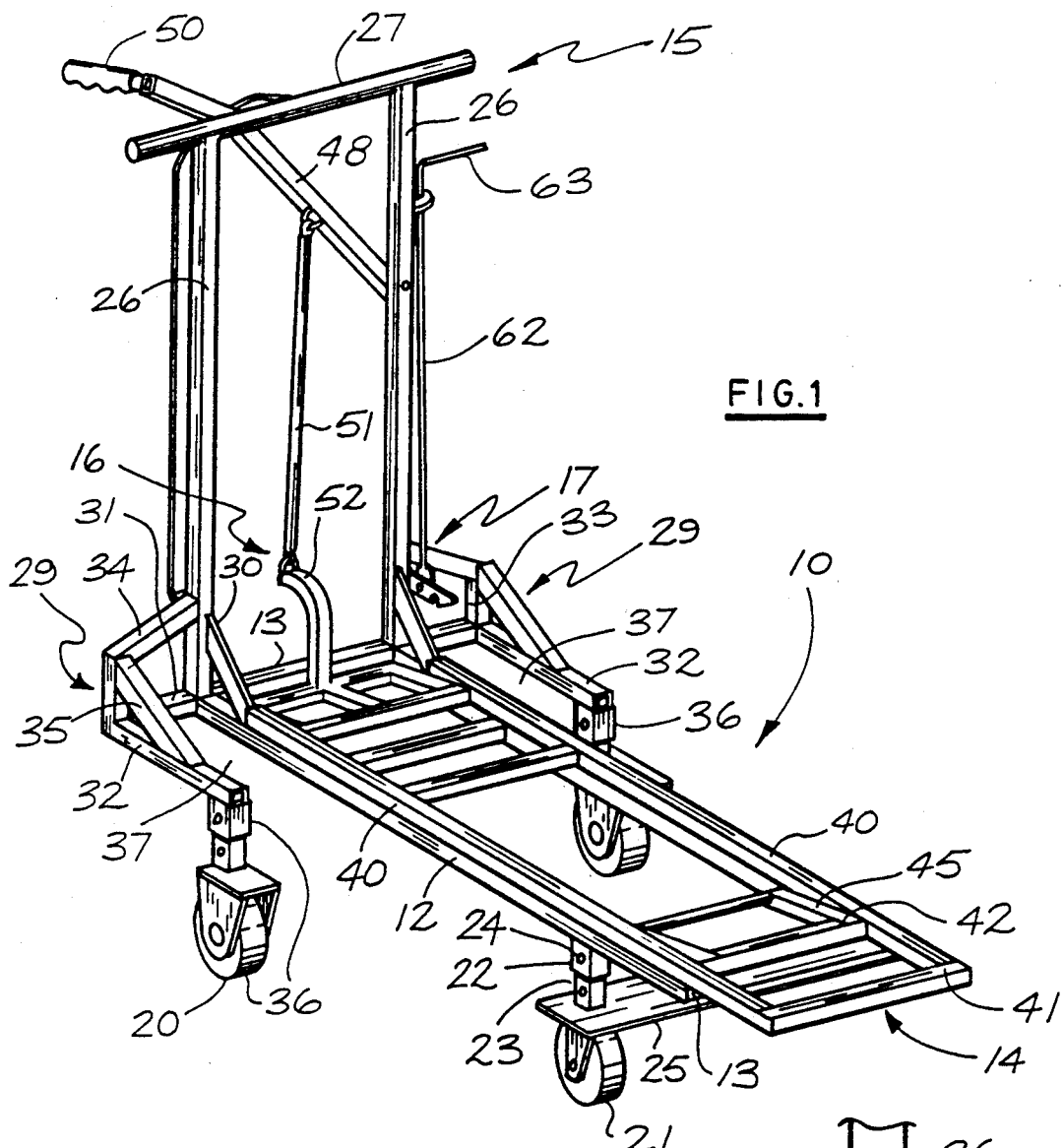
FIG. 1 is a perspective view of the lift truck.

In the drawings, the reference number 10 generally denotes the lift truck of the present invention. The lift truck 10 has a main frame 11 which is of a hollow rectangular configuration formed from a pair of elongated side members 12,12 connected by transverse end members 13,13. An elevating platform 14 is mounted on the main frame 11, and an operator's handle means 15 is formed integrally with a rear end of the main frame and projects upwardly therefrom. The lift truck is provided with manually operable platform raising means 16 and locking means 17 for holding the elevating platform in a raised or elevated position. The main frame 11 is supported on a pair of rear wheels 20,20 and a pair of front wheels 21,21.

The side and end members may be formed, for example, of hollow square tubular steel stock which is welded together to form the rectangular main frame 11. Rearwardly of the front end member 13 there is affixed to the bottom of the side members 12,12 a pair of posts 22,22 which are in the form of one tubular member within the other so as to allow a telescopic action, The tubular members are provided with transverse holes 23 which can be aligned to receive a locking pin 24. Accordingly, the length of the posts 22,22 can be changed depending on the desired height of the main frame 11 above the floor. Affixed to the lower end of the posts 22,22 is a common plate 25 to which is connected the pair of front wheels 21,21. The front wheels are mounted for independent swivel about substantially vertical axes.

The width of the forward portion of the main frame 11, including the front wheels 21,21 and the structure mounting them beneath the front of the main frame, is less than the transverse spacing between the legs on the opposite sides of the chair to be stacked so that the main frame can be pushed in a fore and aft direction under a stack of chairs.

The operator's handle means 15 includes a pair of vertical upright members 26,26 which may also be formed from tubular members of the same type as the members forming the main frame 11. The members 26,26, which are secured, such as by welding, to the top of the rear end member 13, are parallel and terminate at the upper ends thereof in a connection to a transverse member or handle 27, normally grasped by the operator for pulling or pushing the lift truck. Preferably opposite ends of the handle project laterally outward a short distance past the vertical members 26,26. A pair of diagonal plates 30,30 is affixed between the side members 13,13 near the rear of the main frame and the vertical members 26,26 to provide reinforcement to the connection between the main frame and the operator's handle means 15.

Rear wheel mounting means 29,29 connect the rear wheels 20,20 to the rear of the main frame 11 by extension frame means which place the rear wheels laterally outward from the main frame 11 and forward of the rear end member 13 of the main frame. As will be described in more detail below, this feature of the invention provides for good maneuverability of the lift truck and yet results in the required stability while hauling high stacks of chairs. The rear end member 13 is sufficiently long to project outward from opposite sides of the main frame, thus forming laterally extensions 31,31. Each of the extensions 31,31 can be formed, of course, by separate members affixed at one end to the side of the main frame 11, but it is preferable, in any event, that the extensions be located at the rear ends of the side members 12,12. The extensions 31,31 have secured to their outer ends members 32,32, which may be formed of square tubular steel stock as are most of the other forming members of the lift truck. The members 32,32 form forward extensions or arms which are spaced outwardly from and parallel to the rear end portions of the side members 12,12.

The members 31 and 32 of each mounting means 29 are provided with reinforcing structure in the form of a vertical member 33 affixed to the top of the outer end of the member 31, and a bracing member 34 which is affixed to the vertical member 33. The bracing member slants upwardly to its inner end which is affixed to the vertical member 26. A diagonal member 35 is affixed between the upper end of vertical member 33 and the forward extension 32.

The mounting means 29,29 each provide a mounting for one of the rear wheels 20, which wheels are not mounted for swivel movement about a vertical axis. A post 36, which is of the same construction as post 22 so as to allow for adjustment of its length is affixed at its upper end to the forward end of the forward extension 32. The wheel assembly of the wheel 20 is affixed to the lower end of the post 36. As will become more apparent below, the extension means position the wheel outward from the side of the main frame and forwardly from the rear of the main frame with a space 37 between the forward extension or arm 32 and the frame, the space having an open front for receiving the legs of a rear stack 70a of chairs during loading and carrying of the chair stacks.

The elevating platform 14 is also of rectangular configuration having side members 40,40, and a front transverse or end member 41, the spacing between the side members 40,40 being the same as the side members 12,12 of the main frame 11 so that in a lowered or inactive position of the elevating platform 14, the side members 40,40 of the elevating platform rest on the side members 12,12. In the inactive position of the elevating platform 14, its forward end is positioned forward of the front member of the main frame 11.

Figure 6:
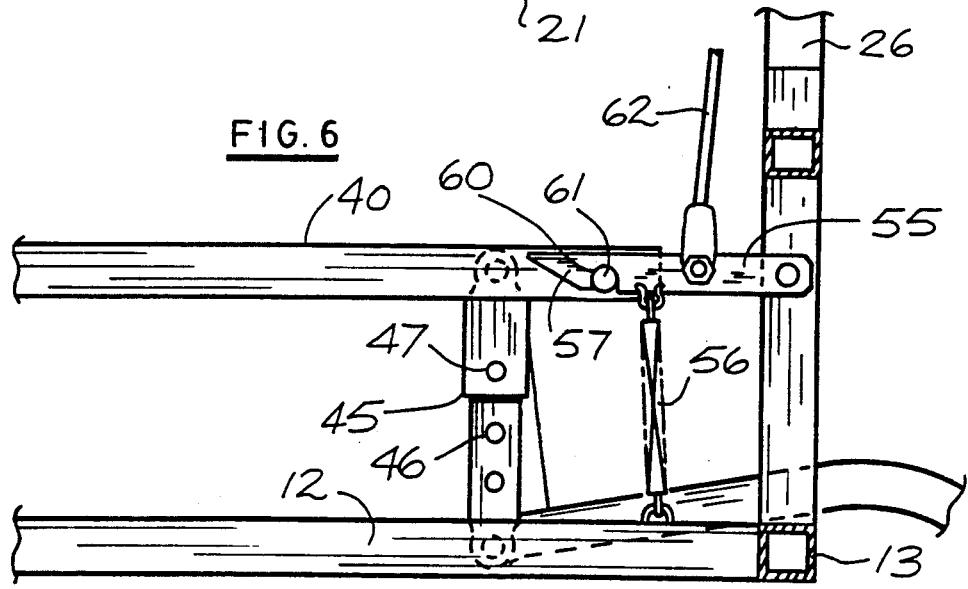
FIG. 6 is an enlarged view of a section of the frame of the lift truck illustration a latching system forming a lock means for holding an elevating platform of the lift truck in an elevated position.

The elevating platform 14 is connected to the main frame 11 by a pair of parallel front and rear linkage means 42,42. Each linkage means includes a lower transverse member 43 extending between side members 12,12 of the main frame 11 and an upper transverse member 44 extending between side members 40,40 of the elevating platform 14, the transverse members 43 and 44 having end means journalled in openings in the side members 12,12 and 40,40, respectively, to allow pivoting of the transverse members relative to the main frame 11 and elevating platform 14 about parallel transverse axes. The transverse members 43 and 44 of each linkage 42,42 are joined by connector members 45, which may be telescoping in nature as illustrated in FIG. 6. As shown, the member 45 is formed by two tubular members, one received within the other and provided within aligned openings 46 for reception of a transverse pin 47 to lock the member 45 at a selected length. Thus, the distance the elevating platform 14 is spaced above the main frame 11, when in the raised position, may be adjusted. The elevated frame is shown in the raised lifting portion in FIG. 6.

Figure 2:
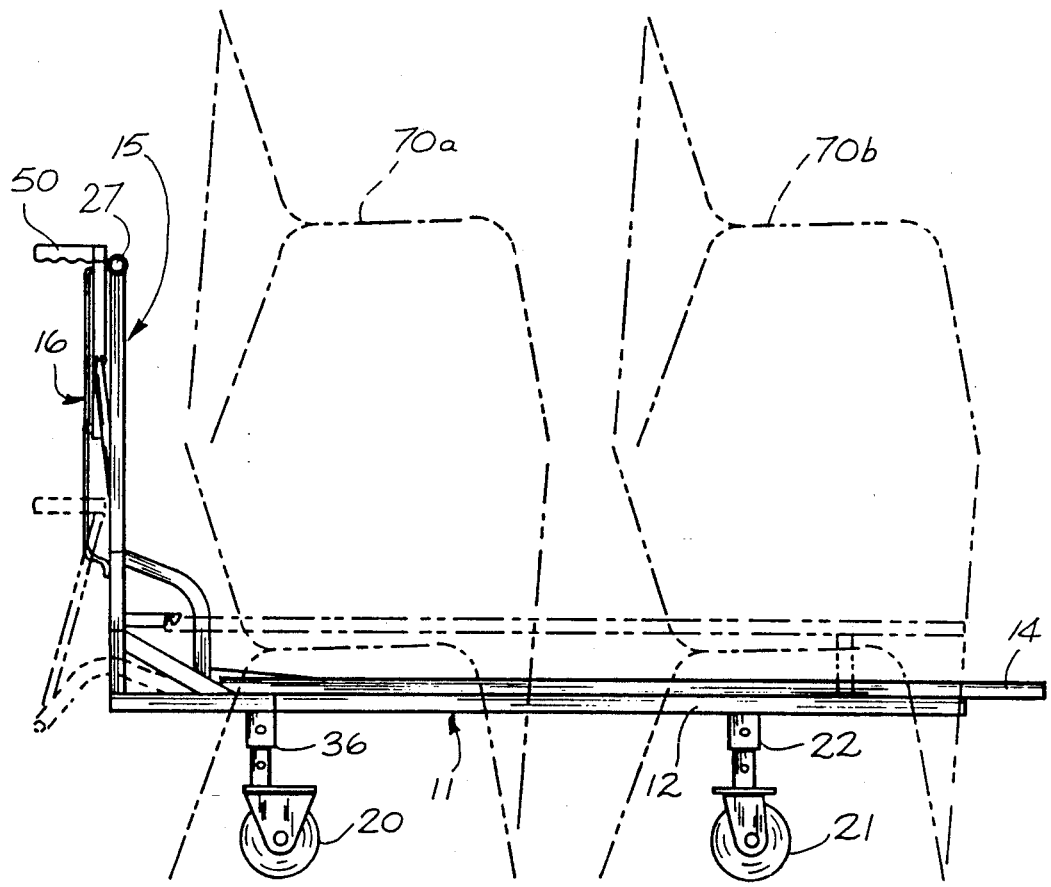
FIG. 2 is a side elevational view of the lift truck of FIG. 1, showing stacks of chairs in chain-dotted lines.
Figure 3:
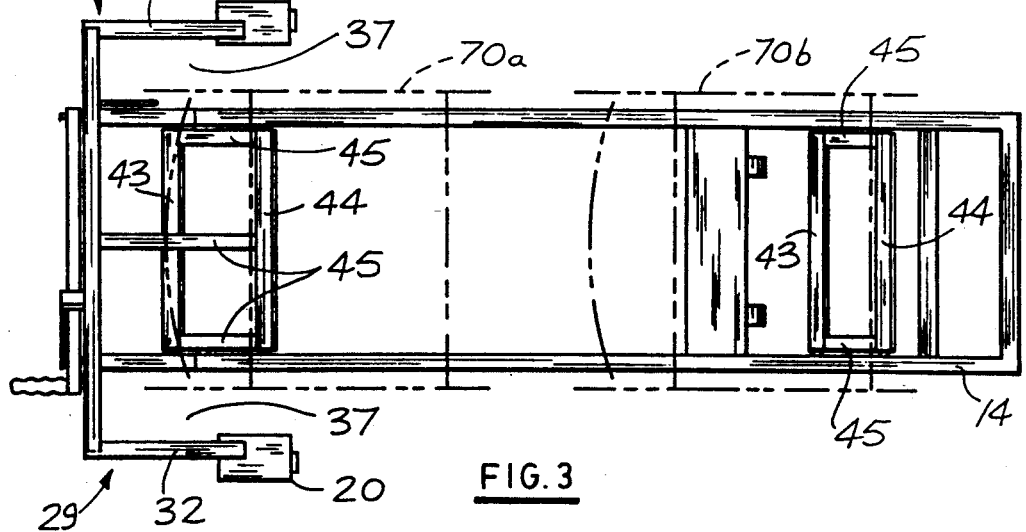
FIG. 3 is a top plan view of the lift truck of FIGS. 1 and 2.

The platform raising means 16 is provided to pivot the linkage means 42 from a substantially horizontal position in which the elevating platform 14 rests on the main frame 11 to a substantially vertical position in which the elevating platform 14 is above the main frame but is disposed horizontal and parallel to the main frame 11. The amount the elevating platform raises when activated by the platform raising means 16 is selected so as to cause the elevating platform to engage the bottom portion of a lowermost chair of a stack of chairs slightly before the elevating platform reaches its completely elevated position as illustrated in chain dotted lines in FIG. 2. Thus, the final movement of the elevating platform to its raised position raises the complete stack of chairs sufficiently to clear the legs of the lowermost chair from the floor over which the stacks of chairs are being transported.

Figure 4:
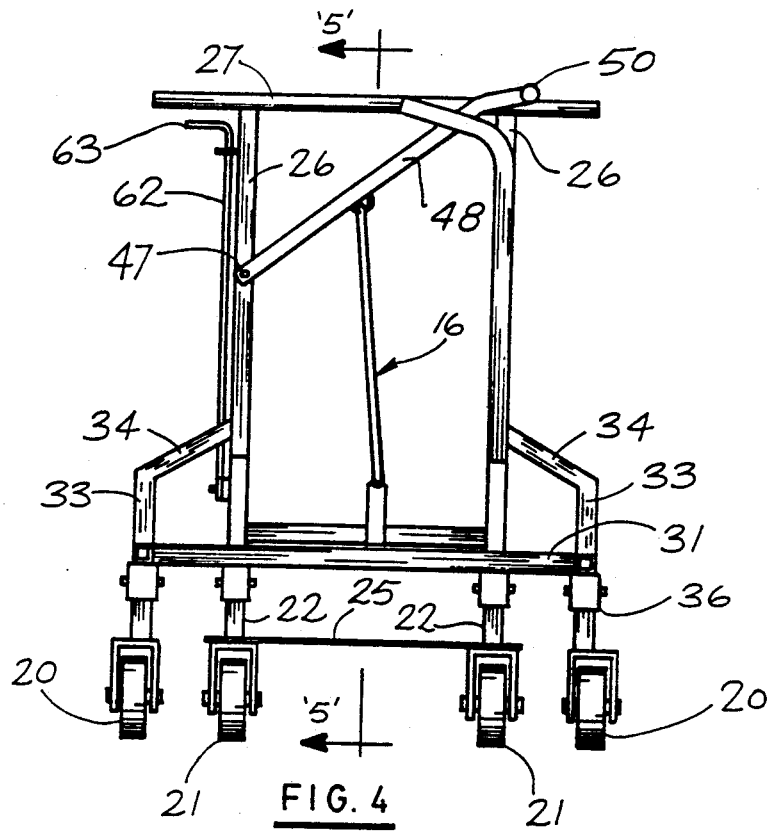
FIG. 4 is a rear view of the lift truck of FIGS. 1 to 3.
Figure 5:
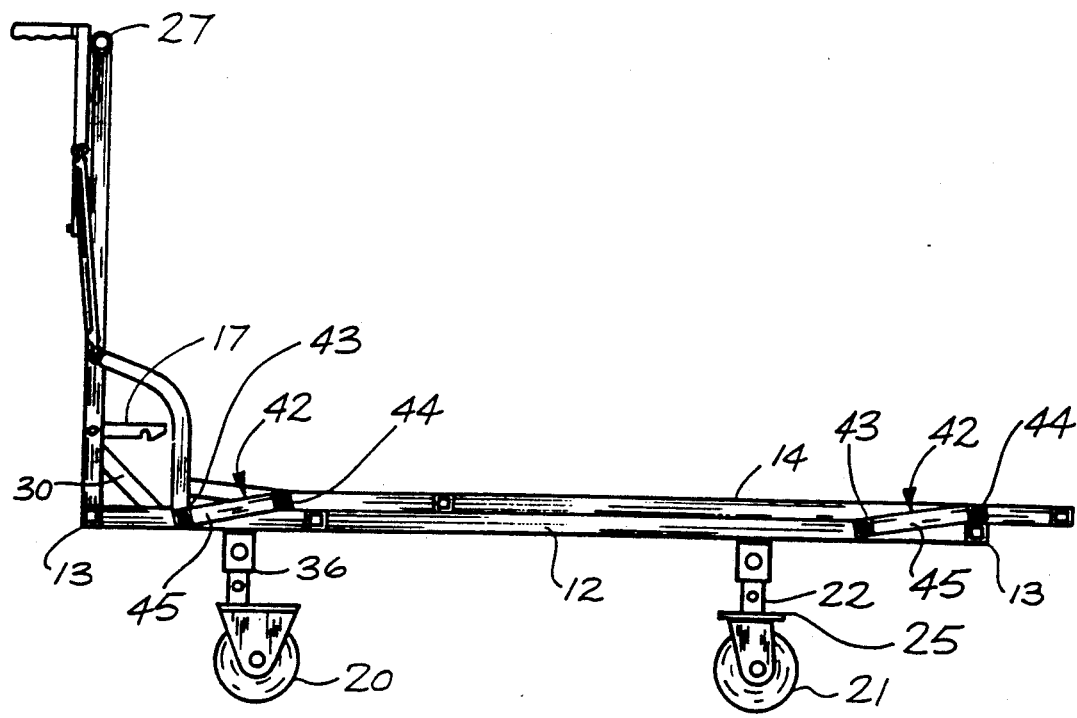
FIG. 5 is a longitudinal section view taken on the line 5—5 of FIG. 4.

The platform raising means 16 includes a lever 48 pivotally connected at one end by a bolt or pin means 47 to the upright or vertical member 26 shown on the right hand side in FIG. 4. The lever 48 has substantial length and terminates in a hand portion 50 which projects rearwardly from lever 48. A link 51 is pivotally connected at one end to an intermediate portion of the lever 48 and at its lower end to the end of a rigid arm 52 which is affixed to the lower transverse member 43 of the rear linkage means 42. The end portion of the arm 52 affixed to the member 43 projects perpendicularly from the lower transverse member 43 and then curves through substantially 90° to an outer end portion to which the link 51 is pivotally connected. The upright or vertical member 26 at the opposite side to the member 26 to which lever 48 is connected is provided with a guide 53 spaced slightly from the vertical member thus forming a slot in which the free end of the lever is disposed. As the lever is pushed down by the operator the lower end of link 51 pushes the outer end portion of the arm 52 rearwardly and downwardly, causing the rear linkage means 42 to swing to an upright position thus raising the elevating platform.

The locking mean 17 includes a latch or lever 55 which is pivotally connected at one end to the lower portion of the vertical member 26. The lever 55 is biased to a horizontal position by way of a tension spring 56, and it has an outer camming end portion 57 and a notch 60 which receives a stud 61 projecting from the side of the member 40 of the elevating platform 14. Thus, as the elevating platform is raised the stud engages the camming end portion 57 and forces the latch to a position in which the stud is captured in the notch 60 to hold the platform in a raised position. A rod 62 is pivotally connected to the lever 55 and extends upwardly to a handle portion 63 accessible to the operator. Thus to permit the elevating platform to return to its lowered position, rod 62 is pulled up by the operator which pivots the lever 55 upwardly, so as to release the platform which returns to its lowered or inactive position.

As an alternative structure, the latch 55 may be mounted on the inner side of the upright member 26. The rod 62 in such a structure, may have an upper portion located at the top on the outer side of the upright member 26, but have a lower portion on the inside of the upright member 26, the upper and lower portions being joined by a transverse portion extending horizontally through an opening provided in the upright member.

The forward portion of the lift truck is preferably of sufficient length to permit a load of at least two stacks 70a and 70b of chairs. Because the wheel base is relatively short in view of the fact the front wheels are rearward of the front of the main frame and the rear wheels are mounted forward of the rear end of the main frame, the truck is readily maneuverable which is important for use in confined areas. The easy maneuverability is also important for use of the lift truck by smaller operators. Also, because the rear wheels are disposed forwardly and outwardly of the main frame, the lift truck is stable, which is important, taking into account that relatively tight stacks may be loaded by persons not necessarily experienced in such moving operations. In view of the manner in which the manually operable lever 46 is maintained for downward movement during the lifting process, it is convenient for the operator to apply weight to the lever in raising both stacks of chairs.

It is apparent to one skilled in the art that various modifications can be made to the illustrated embodiment without departing from the spirit of the invention.

What I claim is:

1. A lift truck for transporting stacking chairs of the type having transversely spaced legs and a bottom portion spaced above floor level, said lift truck comprising:

a main frame supported on front and rear wheels and having a front end, a rear end, a pair of substantially parallel sides defining a generally rectangular configuration, and an operator's handle projecting upwardly from said rear end;

an elevating platform carried on said frame and including lift means for raising said platform from a lowered inoperative position to a raised lifting position, said lifting means including a transverse, manually activated lever pivotally connected to said handle;

said elevating platform in said inoperative position being disposed at a level lower than said bottom portion of said chair and in said lifting position being higher than said bottom portion;

said truck having a forward portion defined by said main frame, front wheels and elevating platform, said forward portion having a width less than the transverse spacing of the chair legs thereby permitting said forward portion of said truck to be pushed in a fore and aft direction under a lowest chair in a stack; and rear wheel mounting means projecting transversely outwardly and forwardly from the rear end of said frame and defining a forwardly open chair leg receiving space between said mounting means and adjacent sides of said main frame, said rear wheel mounting means positioning said rear wheels transversely outwardly from the sides of said main frame and forwardly of said rear end of said main frame.

2. A lift truck as defined in claim 1, wherein said front wheels are disposed rearwardly of said front end of said main frame.

3. A lift truck as defined in claim 2, wherein said front wheels are of a swivel type permitting independent turning of said front wheels about substantially vertical axes.

4. A lift truck as defined in claim 1, wherein said lift means includes fore and aft parallel linkage means connected between main frame and said elevating platform.

5. A lift truck as defined in claim 4, wherein said parallel linkage means includes a first member mounted to pivot about a transverse axis within said main frame and a second member mounted to pivot about an axis in said elevating platform parallel to said transverse axis whereby said elevating platform swings about an arcuate path between said inoperative and lifting positions.

6. A lift truck as defined in claim 5, wherein said parallel linkage means includes a connecting means of adjustable length between said first and second members whereby the height of the elevating platform in said lifting position of said platform may be selected.

7. A lift truck as defined in claim 4, wherein said lift means includes an arm affixed to said parallel linkage means, and a link pivotally connected at opposite ends between said lever and arm.

8. A lift truck as defined in claim 7, wherein said lever is moveable between an inoperative position and an elevating platform lifting position.

9. A lift truck as defined in claim 8 wherein said lever is arranged to pivot downwardly from the inoperative position to a lowered position for causing raising movement of said elevating platform, said link being arranged to push said arm to a position to cause said parallel linkage to swing to the lifting position.

10. A lift truck as defined in claim 9, further comprising a locking means for holding said elevating platform in said lifting position.

11. A lift truck as defined in claim 10, wherein said locking means includes a pivotally mounted latch member spring biased to a locking position, and a manually operable activating rod means mounted on said handle for moving said latch member to an unlocked position.

12. A lift truck according to claim 11, wherein said elevating platform has a projecting stud, said latch having a notch for receiving said stud as said elevating platform moves to said lifting position for holding said elevated platform in said lifting position.

13. A lift truck as defined in claim 12, wherein said latch has a camming surface disposed to be engaged by said stud during movement of said elevating platform to said lifting position for pushing said latch to a position for reception of said stud in said notch.

14. A lift truck as defined in claim 1, wherein said forward portion of said truck is of sufficient length to receive at least two adjacent stacks of chairs.

15. A lift truck as defined in claim 1, wherein said front wheels are connected to said main frame by mounting means, the front wheel mounting means and the rear wheel mounting means including a post section of adjustable length to permit selection of the height of the main frame above floor level.

16. A lift truck for transporting stacking chairs of the type having spaced apart opposite legs and a bottom portion raised above floor level, said lift truck having a front end, a back end and an operator's handle projecting upwardly from said back end and comprising:
   a main frame and an elevating platform, each having longitudinal opposed sides, the distance between said sides being less than the distance between the spaced apart opposite legs of the stacking chairs; lift means connected to said elevating platform for raising said elevating platform, said lift means including a transverse, manually actuated lever pivotally connected to said handle; and forward and rear wheels;
   said elevating platform having a rest position and an elevated position, said rest position being lower than the bottom portion of the lowermost stacking chair, and said elevated position being higher than the bottom portion of the lowermost stacking chair;
   said forward wheels being mounted on the main frame at the front end of the lift truck, and said rearward wheels being mounted on arms extending from and running parallel to said main frame at the back end of the lift truck, said arms forming a channel between the arms and the main frame to receive the legs of the stacking chairs;
   wherein, with the elevating platform in rest position, the front end of the lift truck may be pushed between the legs and under the stacking chairs, and
   whereby elevation of the elevating platform by actuation of the lift means raises the stack of chairs above floor level for transport.

17. The lift truck of claim 16 wherein said lift means comprises:
   forward and rearward parallel link lift assemblies having an upper and lower end, each of said lift assemblies being pivotally connected at the lower end to the main frame and at the upper end to the elevating platform;
   a lift arm fixed to the lower end of the rearward lift assembly; and
   a connecting linkage connecting the lift arm and the actuating lever.

18. A lift truck for transporting stacking chairs of the type having transversely spaced legs and a bottom portion spaced above floor level, said lift truck comprising:
   a main frame supported on front and rear wheels and having a front end, a rear end, and a pair of substantially parallel sides defining a generally rectangular configuration;
   an operator's handle projecting upwardly from said rear end of said main frame;
   an elevating platform carried on said frame and including lift means for raising said platform from a lowered inoperative position to a raised lifting position;
   said elevating platform in said inoperative position being disposed at a level lower than said bottom portion of said chair and in said lifting position being higher than said bottom portion;
   said lift means including fore and aft parallel linkage means connected between said main frame and said elevating platform, said parallel linkage means including a first member mounted to pivot about a transverse axis within said main frame and a second member mounted to pivot about an axis in said elevating platform parallel to said transverse axis whereby said elevating platform swings about an arcuate path between said inoperative and lifting positions;
   said lift means further including a manually actuated lever pivotally connected to said handle, an arm affixed to said parallel linkage means, and a link pivotally connected at opposite ends between said lever and arm, said lever being movable between an inoperative position and an elevating platform lifting position, said lever being arranged to pivot downwardly from the inoperative position to a lowered position for causing raising movement of said elevating platform, said link being arranged to push said arm to a position to cause said linkage to swing to the lifting position;
   a locking means for holding said elevating platform in said lifting position, said locking means including a pivotally mounted latch member spring biased to a locking position and a manually operable activating rod means mounted on said handle for moving said latch member to an unlocked position;
   said truck having a forward portion defined by said main frame, front wheels and elevating platform,
   said forward portion having a width less than the transverse spacing of the chair legs thereby permitting said forward portion of said truck to be pushed in a fore and aft direction under a lower chair in a stack; and
   rear wheel mounting means projecting transversely outwardly and forwardly from the rear end of said frame and defining a forwardly open chair leg receiving space between said mounting means and adjacent sides of said main frame,
   said rear wheel mounting means positioning said rear wheels transversely outwardly from the sides of said main frame and forwardly of said rear end of said main frame.

* * * * *